(12) United States Patent
White, III

(10) Patent No.: US 11,448,075 B2
(45) Date of Patent: Sep. 20, 2022

(54) CMC VANE ARC SEGMENT WITH CANTILEVERED SPAR

(71) Applicant: Raytheon Technologies Corporation, Farmington, CT (US)

(72) Inventor: Robert A. White, III, Meriden, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/086,893

(22) Filed: Nov. 2, 2020

(65) Prior Publication Data

US 2022/0136393 A1    May 5, 2022

(51) Int. Cl.
*F01D 9/06* (2006.01)
*F01D 5/18* (2006.01)
*F01D 5/28* (2006.01)

(52) U.S. Cl.
CPC ............ *F01D 5/187* (2013.01); *F01D 5/284* (2013.01); *F01D 9/065* (2013.01); *F05D 2260/201* (2013.01)

(58) Field of Classification Search
CPC .......... F01D 5/187; F01D 5/284; F01D 9/042; F01D 9/065; F05D 2260/201; F05D 2240/126
See application file for complete search history.

(56) References Cited

U.S. PATENT DOCUMENTS

| | | | | |
|---|---|---|---|---|
| 3,301,527 A | * | 1/1967 | Kercher | F01D 5/189 415/115 |
| 6,224,339 B1 | * | 5/2001 | Rhodes | F01D 5/186 416/224 |
| 6,283,708 B1 | * | 9/2001 | Zelesky | F01D 5/189 416/97 R |
| 8,292,580 B2 | * | 10/2012 | Schiavo | F01D 5/189 416/96 A |
| 10,309,240 B2 | | 6/2019 | Heitman et al. | |
| 10,612,385 B2 | * | 4/2020 | Schetzel | F01D 5/284 |
| 10,774,665 B2 | | 9/2020 | Greene et al. | |
| 10,808,560 B2 | * | 10/2020 | Sippel | F01D 11/001 |

(Continued)

FOREIGN PATENT DOCUMENTS

EP    3670842    6/2020

OTHER PUBLICATIONS

European Search Report for European Patent Application No. 21205653.5 dated Apr. 28, 2022.

*Primary Examiner* — Eldon T Brockman
(74) *Attorney, Agent, or Firm* — Carlson, Gaskey & Olds, P.C.

(57) ABSTRACT

A vane arc segment includes a hollow ceramic airfoil section that has walls that define an internal cavity, a trailing edge, a leading edge, a pressure side, and a suction side. A structural spar piece supports the hollow ceramic airfoil section. The spar piece includes a first spar platform, a hollow leg that has a proximal end at the spar platform and an opposed distal end. The hollow leg extends into the internal cavity of the hollow ceramic airfoil section and has an outer surface with raised bearing pads. Multiple ones of the bearing pads contact the walls of the hollow ceramic airfoil section to support the hollow ceramic airfoil section. A second spar platform is secured with the distal end of the leg.

18 Claims, 4 Drawing Sheets

(56) References Cited

U.S. PATENT DOCUMENTS

| | | | |
|---|---|---|---|
| 10,883,371 B1* | 1/2021 | Smith | F01D 5/147 |
| 2010/0068034 A1* | 3/2010 | Schiavo | F01D 5/282 |
| | | | 415/115 |
| 2010/0129196 A1* | 5/2010 | Johnston | F01D 5/188 |
| | | | 415/115 |
| 2017/0254207 A1* | 9/2017 | Schetzel | F01D 5/147 |
| 2019/0153879 A1 | 5/2019 | Vetters et al. | |
| 2019/0368360 A1 | 12/2019 | Freeman et al. | |
| 2019/0390558 A1* | 12/2019 | Sippel | F01D 9/065 |
| 2020/0400026 A1* | 12/2020 | Smith | F01D 25/12 |

* cited by examiner

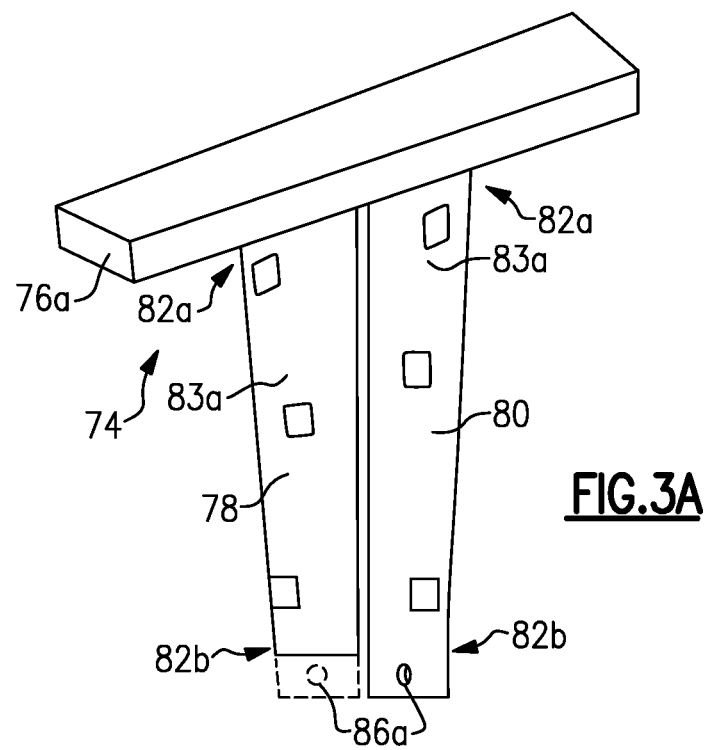
FIG.3A
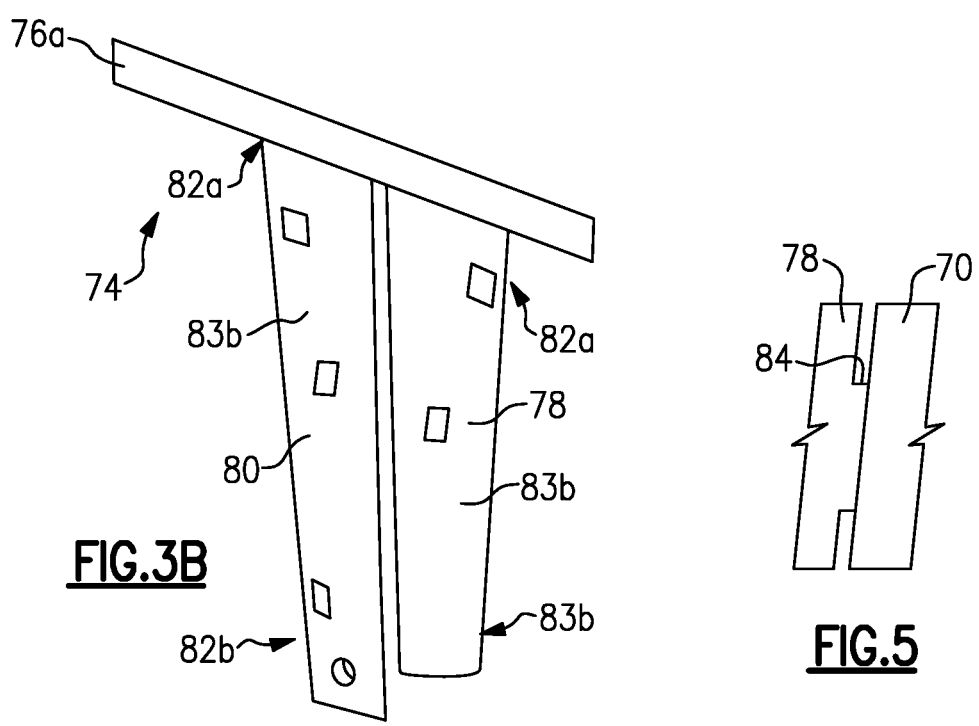
FIG.3B
FIG.5

CMC VANE ARC SEGMENT WITH CANTILEVERED SPAR

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A vane arc segment according to an example of the present disclosure includes a hollow ceramic airfoil section having walls defining an internal cavity, a trailing edge, a leading edge, a pressure side, and a suction side. A structural spar piece supports the hollow ceramic airfoil section. The structural spar piece has a first spar platform, and a hollow leg having a proximal end at the spar platform and an opposed distal end. The hollow leg extends into the internal cavity of the hollow ceramic airfoil section. The hollow leg defines an outer surface with raised bearing pads projecting therefrom. Multiple ones of the raised bearing pads contact the walls of the hollow ceramic airfoil section to support the hollow ceramic airfoil section, and a second spar platform is secured with the distal end of the leg.

In a further embodiment of any of the foregoing embodiments, the leg has a first side facing toward the pressure side and a second side facing toward the suction side, and there are raised bearing pads on the first side and the second side.

In a further embodiment of any of the foregoing embodiments, the walls of the hollow ceramic airfoil section define one or more ribs that divide the internal cavity into a plurality of cavities, the hollow leg has a third side that faces toward the one or more ribs, and there are bearing pads on the third side.

In a further embodiment of any of the foregoing embodiments, the hollow leg includes an internal spar cavity that is fluidly isolated in the hollow ceramic airfoil section from the internal cavity.

In a further embodiment of any of the foregoing embodiments, the distal end of the hollow leg includes a lock orifice and a lock pin disposed in the lock orifice.

In a further embodiment of any of the foregoing embodiments, the multiple ones of the raised bearing pads that contact the walls are in areal contact with the walls.

In a further embodiment of any of the foregoing embodiments, the structural spar piece is formed of a single crystal alloy.

In a further embodiment of any of the foregoing embodiments, the hollow leg has a total of nine or fewer of the raised bearing pads.

In a further embodiment of any of the foregoing embodiments, ones of the raised bearing pads that are on a same side of the hollow leg are spaced apart.

In a further embodiment of any of the foregoing embodiments, the hollow ceramic airfoil section has at least one airfoil platform that is in contact with the spar platform.

A vane arc segment according to an example of the present disclosure includes a hollow ceramic airfoil section having walls defining forward and aft internal cavities, a trailing edge, a leading edge, a pressure side, and a suction side; and a structural spar piece supporting the hollow ceramic airfoil section. The structural spar piece has a first spar platform, and first and second hollow legs each having a proximal end at the spar platform and an opposed distal end. The first hollow leg extends into the forward internal cavity and the second hollow leg extending into the aft internal cavity. The first and second hollow legs each define an outer surface with raised bearing pads projecting therefrom. The raised bearing pads contact the walls of the hollow ceramic airfoil section to support the hollow ceramic airfoil section, and a second spar platform secured with the distal end of at least one of the first or second hollow legs.

In a further embodiment of any of the foregoing embodiments, one of the first or second hollow legs extends through the hollow ceramic airfoil section.

In a further embodiment of any of the foregoing embodiments, each of the first and second hollow legs has a first side facing toward the pressure side and a second side facing toward the suction side, and there are raised bearing pads on the first side and the second side.

In a further embodiment of any of the foregoing embodiments, each of the first and second hollow legs includes an internal spar cavity that is fluidly isolated in the hollow ceramic airfoil section from, respectively, the forward and aft internal cavities.

In a further embodiment of any of the foregoing embodiments, the distal end of at least one of the first or second hollow legs includes a lock orifice and a lock pin disposed in the lock orifice.

In a further embodiment of any of the foregoing embodiments, the structural spar piece is formed of a single crystal alloy.

A gas turbine engine according to an example of the present disclosure includes a compressor section, a combustor in fluid communication with the compressor section, and a turbine section in fluid communication with the combustor. The turbine section has vane arc segments disposed about a central axis of the gas turbine engine. Each of the vane arc segments includes a hollow ceramic airfoil section having walls defining an internal cavity, a trailing edge, a leading edge, a pressure side, and a suction side, and a structural spar piece supporting the hollow ceramic airfoil section. The structural spar piece has a first spar platform, and a hollow leg having a proximal end at the spar platform and a distal end. The hollow leg extends into the internal cavity of the hollow ceramic airfoil section. The hollow leg defines an outer surface with raised bearing pads projecting therefrom. The raised bearing pads contact the walls of the hollow ceramic airfoil section to support the hollow ceramic airfoil section, and a second spar platform secured with the distal end of the leg.

In a further embodiment of any of the foregoing embodiments, the leg has a first side facing toward the pressure side and a second side facing toward the suction side, and there are raised bearing pads on the first side and the second side.

In a further embodiment of any of the foregoing embodiments, the hollow leg includes an internal spar cavity that is fluidly isolated in the hollow ceramic airfoil section from the internal cavity.

In a further embodiment of any of the foregoing embodiments, the hollow ceramic airfoil section has at least one airfoil platform that is in contact with the spar platform.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 3A illustrates pressure side view of a spar piece.

FIG. 3B illustrates a suction side view of the spar piece.

FIG. 5 illustrates a raised bearing pad in areal contact with a wall of an airfoil.

DETAILED DESCRIPTION

Figure 1:
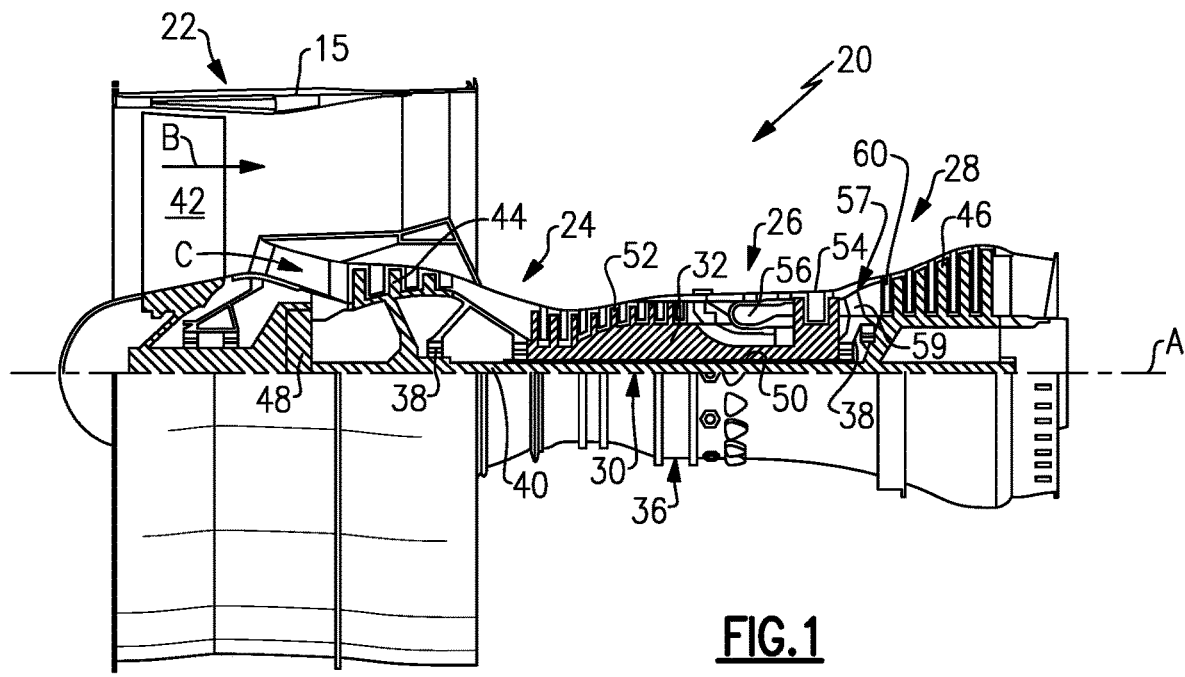
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}\ °\ R)/(518.7°\ R)]^{0.5}$. The "Low corrected fan tip speed" as disclosed herein according to one non-limiting embodiment is less than about 1150 ft/second (350.5 meters/second).

Figure 2A:
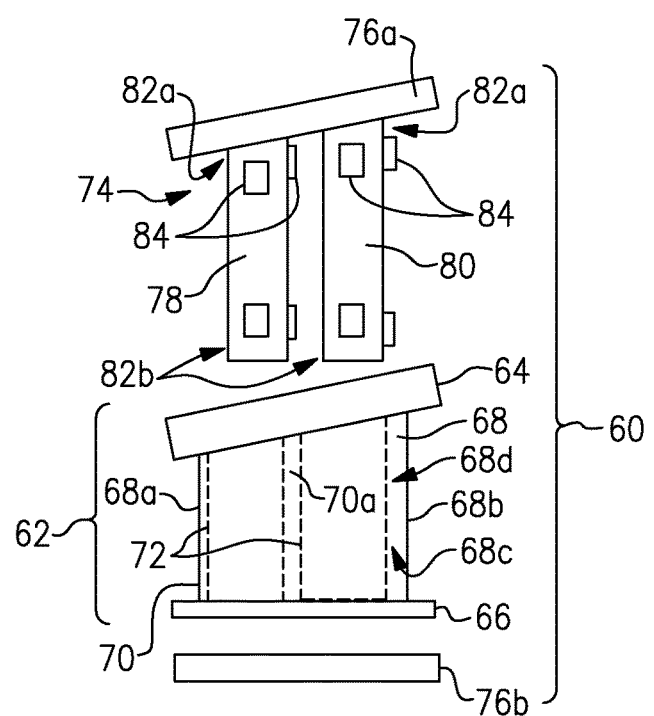
FIG. 2A illustrates an expanded view of a vane arc segment.
Figure 2B:
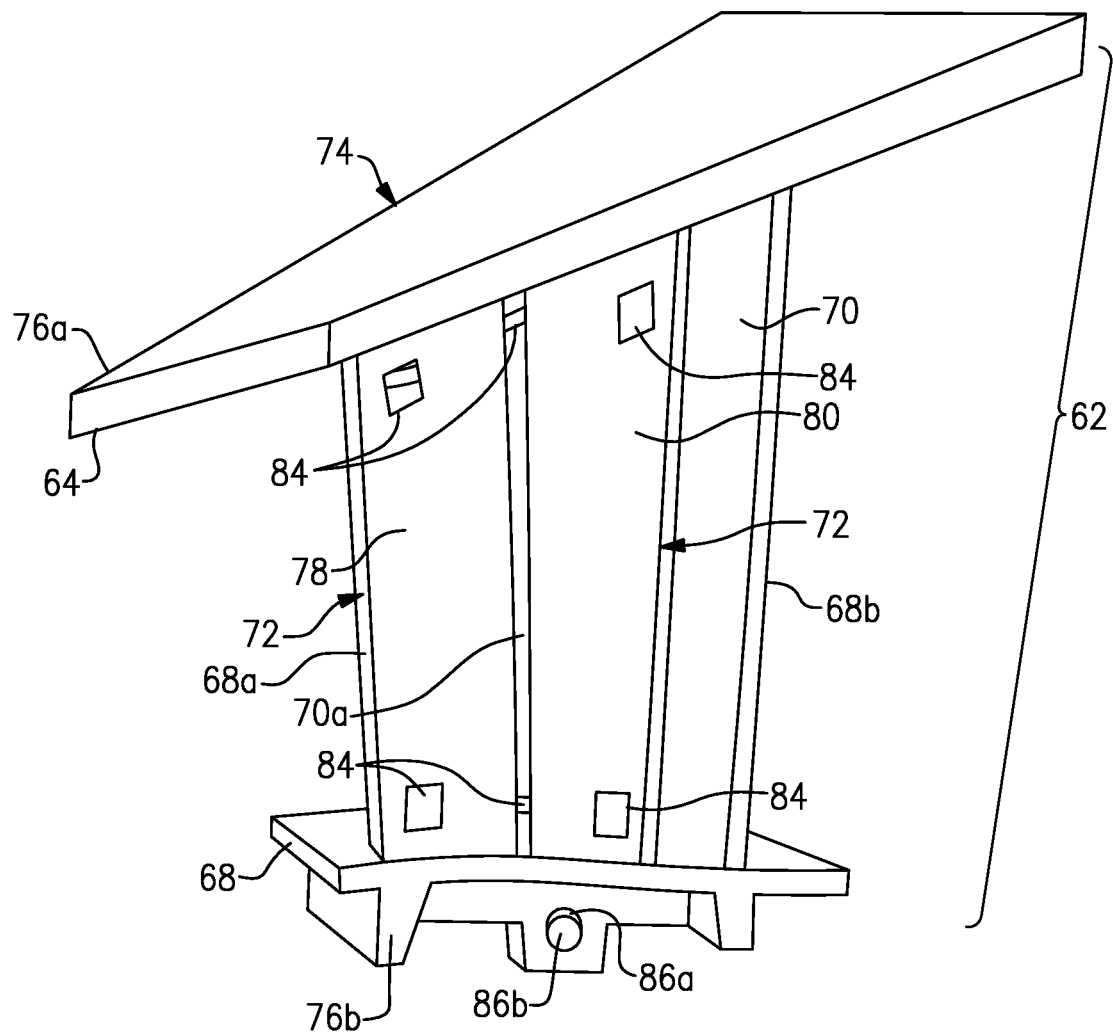
FIG. 2B illustrates an assembled view of a vane arc segment.

FIG. 2A illustrates a schematic expanded view of a representative vane arc segment 60 of a vane ring assembly from the turbine section 28 of the engine 20, and FIG. 2B illustrates a fully assembled view of the vane arc segment 60 (without a portion of the pressure side wall so that the interior of the vane can be seen). The vane arc segments 60 are situated in a circumferential row about the engine central axis A. Although the vane arc segment 60 is shown and described with reference to use in the turbine section 28, it is to be understood that the examples herein are also applicable to vanes in other sections of the engine 20.

The vane arc segment 60 is comprised of a hollow ceramic airfoil section 62. The hollow ceramic airfoil section 62 includes first and second platforms 64/66 and an airfoil 68 that extends between the platforms 64/66. In this example, the first platform 64 is a radially outer platform and the second platform 66 is a radially inner platform. The airfoil 68 is formed of walls 70 that define a leading edge 68a, a trailing edge 68b, pressure and suction sides 68c/68d, and at least one internal cavity 72. In this example, the walls 70 include a rib 70a such that there are at least two such cavities 72, which may also be considered to be a forward cavity and an aft cavity.

The hollow ceramic airfoil section 62 is continuous in that the platforms 64/66 and airfoil 68 constitute a one-piece body. As an example, the hollow ceramic airfoil section 62 is formed of a ceramic material, such as a ceramic matrix composite. For instance, the ceramic matrix composite is formed of ceramic fibers that are disposed in a ceramic matrix. The ceramic matrix composite may be, but is not limited to, a SiC/SiC ceramic matrix composite in which SiC fibers are disposed within a SiC matrix. The ceramic fibers are provided in fiber plies. The plies may be woven or unidirectional and may collectively include plies of the same or different fiber weave configurations. One or more of the plies may be continuous through the first platform 64, the airfoil 68, and the second platform 68.

Figure 4:
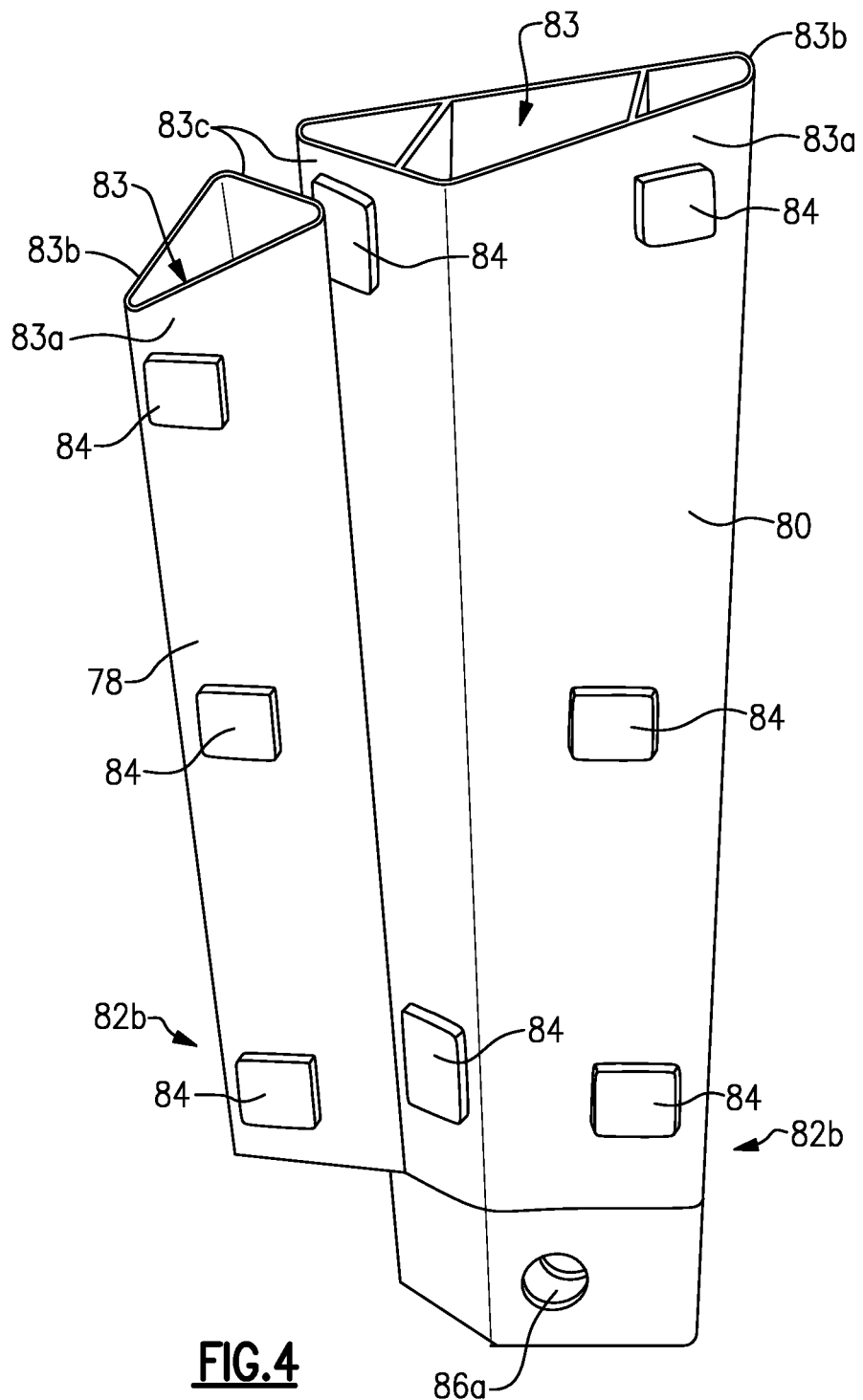
FIG. 4 illustrates an isolated view of spar legs without a spar platform.

The vane arc segment 60 is supported in the engine 20 by a structural spar piece 74, which is also shown in isolated views in FIGS. 3A and 3B. FIG. 3A is a pressure side view and FIG. 3B is a suction side view. The spar piece 74 is formed of a metallic alloy, such as but not limited to a single crystal nickel alloy. The spar piece 74 is comprised of a first spar platform 76a and first and second hollow legs 78/80. Although not shown, the spar platform 76a may have attachment features for supporting the spar piece 74 via an engine case or other fixed engine structure. The hollow legs 78/80 are also shown in an isolated view in FIG. 4, without the first platform 76a. As will be appreciated, although the spar piece 74 has two hollow legs in this example, it may alternatively have a single hollow leg or three or more hollow legs. Each hollow leg 78/80 is cantilevered off of the first spar platform 76a and has a proximal end 82a at the spar platform 76a and an opposed distal end 82b. As will be discussed further below, the hollow legs 78/80 extend into the respective internal cavities 72 of the hollow ceramic airfoil section 62.

The walls of the legs 78/80 define first and second sides 83a/83b and an adjoining third side 83c. Inside of the airfoil 68, the first side 83a faces toward the pressure side 68c of the airfoil 68, the second side faces toward the suction side 68d of the airfoil 68, and the third side faces toward the rib 70a. The walls of the legs 78/80 also encompass internal spar cavities 83 (FIG. 4), one or more of which may be sub-divided by internal spar ribs. Such spar ribs may serve to stiffen the leg or legs 78/80 and carry bending and/or torsional loads. The walls of the legs 78/80 are solid and continuous (without through-holes) such that the internal spar cavities 83 are fluidly isolated from the internal cavities 72 inside of the airfoil 68. In this regard, cooling air, such as bleed air from the compressor section 24, may be provided through the cavities 83 to a downstream destination that is to be cooled. The downstream destination may be, but is not limited to, a turbine blade or a tangential on board injector (TOBI).

The outer surfaces of each hollow leg 78/80 have raised bearing pads 84 that project therefrom. In the example shown, the bearing pads 84 are substantially rectangular, although other polygonal or rounded geometries may alternatively be used. For instance, the raised bearing pads 84 are integral to the walls of the legs 78/80. The raised bearing pads 84 may be formed by casting, machining, or combinations thereof, for example. As depicted in FIG. 2B, multiple ones of the raised bearing pads 84 contact the walls 70 of the hollow ceramic airfoil section 62 and thereby support the hollow ceramic airfoil section 62 from within. For instance, FIG. 5 depicts a representative example in which the raised bearing pad 84 is in areal contact with the wall 70. As used herein, the term "areal contact" or variations thereof refers to contact between substantially the entire outward face of the raised bearing pad 84 and the wall 70. In this regard, the outward face of each bearing pad 84 is contoured to match the localized contour of the wall 70 at the location of the bearing pad 84.

The legs 78/80 have relatively few of the raised bearing pads 84 in comparison to other types of functional projections such as stand-offs that are used on baffles. For instance, in the example shown, each of the legs 78/80 includes a first group of the pads 84 at the proximal end 82a, a second group of the pads 84 at the distal end 82b, and a third group of the pads 84 intermediate the ends 82a/82b. A "group" of pads 84 are pads that lie in a common span range. The groups are spaced relatively far apart. For example, the groups are spaced apart so as to maximize the wheelbase between adjacent groups while minimizing encroachment on other nearby design features. In further examples, the legs 78/80 exclude the third group such that the first and second groups at the end 82a/82b are the only pads 84.

The spar piece 74 further includes a second spar platform 76b that is secured directly to the distal end 82b of at least one of the hollow legs 78/80. For example, one or both of the hollow legs 78/80 includes a lock orifice 86a and a lock pin 86b (FIG. 2B) disposed through the lock orifice 86a. The lock pin 86b is of sufficient size such that it prevents the hollow leg 78 or 80 from being retracted through the internal cavity 72, thereby locking the spar piece 74 and hollow ceramic airfoil section 62 together. If one of the hollow legs 78/80 does not have a lock orifice, that leg 78/80 may be shorter such that it extends only a portion of the span of the cavity 72 of the airfoil 68. The shorter leg may also facilitate a reduction in thermal stress between the spar piece 74 and the ceramic airfoil 68. Optionally, as shown in dashed lines in FIG. 3A, the other leg 78 may also have a lock orifice 86a for receiving a second lock pin. For example, both legs 78/80 may have the lock orifices 86a and lock pins 86b to handle higher radial loads and/or moment force on the spar piece 74.

In general, support schemes for mounting vane segments formed of ceramic matrix composites are challenging due to lower material stress limits in comparison to high strength superalloys used for some traditional vane segments. For instance, traditional support schemes that utilize hooks or a series of rails can concentrate stresses, create aerodynamic loads, and/or create thermal stresses which may exceed material limits of ceramic matrix composites. Therefore, even though ceramic matrix composites may have many potential benefits, such benefits cannot be realized without a suitable support scheme. In this regard, the legs 78/80 with the raised bearing pads 84 serve as support features to facilitate a low-stress mounting scheme from the inside of the airfoil 68, as opposed to an attachment scheme at the radial ends of the airfoil.

During operation of the engine 20 combustion gases flow across the airfoil 68 and platforms 64/66. The flow causes aerodynamic loads, which are transmitted through the spar piece 74 to engine support structure(s). For example, the raised bearing pads 84 are located at high load locations at which the airfoil 68 experiences maximum loads under the Durability or Structures Design Point (DDP & SDP, respectively). Such locations may be determined experimentally or by computer simulation. As an example, the locations are those at which the airfoil 68 experiences peak twist or bending deflection. Such locations may also be adjusted during a design phase by changing the location, angle, and/or presence of ribs. In this regard, one or more of the raised bearing pads 84 may not be in contact with the walls 70 of the airfoil 68 when in a cold, non-operating condition. However, under operating temperatures and aerodynamic forces, deflection of the airfoil 68 causes contact between two or more of the raised bearing pads 84 and the walls 70. In general, such deflection may be in an aft direction and radially outward direction. Therefore, raised bearing pads 84 that are on forward portions of the legs 78/80 may not be in contact with the walls 70, while raised bearing pads 84 that are on aft portions of the legs 78/80 may be in contact with the walls 70, such as the rib 70a.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane arc segment comprising:
   a hollow ceramic airfoil section having walls defining an internal cavity, a trailing edge, a leading edge, a pressure side, and a suction side, the walls defining one or more ribs that divide the internal cavity into a plurality of cavities; and
   a structural spar piece supporting the hollow ceramic airfoil section, the structural spar piece having:
      a first spar platform,
      a hollow leg having a proximal end at the spar platform and an opposed distal end, the leg having a first side facing toward the pressure side, a second side facing toward the suction side, and a third side that faces toward the one or more ribs, the hollow leg extending into the internal cavity of the hollow ceramic airfoil section,
      the hollow leg defining an outer surface with raised bearing pads projecting therefrom on the first side, the second side, and the third side,
      multiple ones of the raised bearing pads contacting the walls of the hollow ceramic airfoil section to support the hollow ceramic airfoil section, and
      a second spar platform secured with the distal end of the leg.

2. The vane arc segment as recited in claim 1, wherein the hollow leg includes an internal spar cavity that is fluidly isolated in the hollow ceramic airfoil section from the internal cavity.

3. The vane arc segment as recited in claim 1, wherein the distal end of the hollow leg includes a lock orifice and a lock pin disposed in the lock orifice.

4. The vane arc segment as recited in claim 1, wherein the multiple ones of the raised bearing pads that contact the walls are in areal contact with the walls.

5. The vane arc segment as recited in claim 1, wherein the structural spar piece is formed of a single crystal alloy.

6. The vane arc segment as recited in claim 1, wherein the hollow leg has a total of nine or fewer of the raised bearing pads.

7. The vane arc segment as recited in claim 1, wherein ones of the raised bearing pads that are on a same side of the hollow leg are spaced apart.

8. The vane arc segment as recited in claim 1, wherein the hollow ceramic airfoil section has at least one airfoil platform that is in contact with the spar platform.

9. The vane arc segment as recited in claim 1, wherein the raised bearing pads are formed in the outer surface of the hollow leg and are polygonal.

10. A vane arc segment comprising:
    a hollow ceramic airfoil section having walls defining forward and aft internal cavities, a trailing edge, a leading edge, a pressure side, and a suction side; and
    a structural spar piece supporting the hollow ceramic airfoil section, the structural spar piece having:
       a first spar platform,
       first and second hollow legs each having a proximal end at the first spar platform and an opposed distal end, the first hollow leg extending into the forward internal cavity and the second hollow leg extending into the aft internal cavity,
       the first and second hollow legs each defining an outer surface with raised bearing pads projecting therefrom, each of the first and second hollow legs including an internal spar cavity that is fluidly isolated in the hollow ceramic airfoil section from, respectively, the forward and aft internal cavities,
       the raised bearing pads contacting the walls of the hollow ceramic airfoil section to support the hollow ceramic airfoil section, and
       a second spar platform secured with the distal end of at least one of the first or second hollow legs.

11. The vane arc segment as recited in claim 10, wherein one of the first or second hollow legs extends through the hollow ceramic airfoil section.

12. The vane arc segment as recited in claim 10, wherein each of the first and second hollow legs has a first side facing toward the pressure side and a second side facing toward the suction side, and there are raised bearing pads on the first side and the second side.

13. The vane arc segment as recited in claim 10, wherein the distal end of at least one of the first or second hollow legs includes a lock orifice and a lock pin disposed in the lock orifice.

14. The vane arc segment as recited in claim 10, wherein the structural spar piece is formed of a single crystal alloy.

15. A gas turbine engine comprising:
    a compressor section;
    a combustor in fluid communication with the compressor section; and
    a turbine section in fluid communication with the combustor, the turbine section having vane arc segments disposed about a central axis of the gas turbine engine, each of the vane arc segments includes:

a hollow ceramic airfoil section having walls defining an internal cavity, a trailing edge, a leading edge, a pressure side, and a suction side, the walls defining a rib connecting the pressure side and the suction side and dividing the internal cavity into forward and aft internal cavities; and a structural spar piece supporting the hollow ceramic airfoil section, the structural spar piece having:
a first spar platform,
first and second hollow legs each having a proximal end at the first spar platform and an opposed distal end, the structural spar piece straddling the rib such that the first hollow leg extending into the forward internal cavity and the second hollow leg extending into the aft internal cavity,
the first and second hollow legs each defining an outer surface with raised bearing pads projecting therefrom,
the raised bearing pads contacting the walls of the hollow ceramic airfoil section to support the hollow ceramic airfoil section, and
a second spar platform secured with the distal end of at least one of the first or second hollow legs.

16. The gas turbine engine as recited in claim 15, wherein the hollow ceramic airfoil section has at least one airfoil platform that is in contact with the spar platform.

17. The gas turbine engine as recited in claim 15, wherein the first hollow leg has a first side facing toward the pressure side, a second side facing toward the suction side, and a third side that facing toward the rib, and there are raised bearing pads on the third side that contact the rib.

18. The gas turbine engine as recited in claim 15, wherein each of the first and second hollow legs includes an internal spar cavity that is fluidly isolated in the hollow ceramic airfoil section from, respectively, the forward and aft internal cavities.

* * * * *